United States Patent
Gerhard et al.

(10) Patent No.: US 11,665,002 B2
(45) Date of Patent: May 30, 2023

(54) AUTHENTICATED ELEVATED ACCESS REQUEST

(71) Applicant: International Business Machines Corporation, Armonk, NY (US)

(72) Inventors: Adrian C. Gerhard, Rochester, MN (US); Matthew Vaught, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 17/119,149

(22) Filed: Dec. 11, 2020

(65) Prior Publication Data

US 2022/0191041 A1 Jun. 16, 2022
US 2022/0191041 A1 Jun. 16, 2022

(51) Int. Cl.
| | |
|---|---|
| *H04L 29/06* | (2006.01) |
| *H04L 9/32* | (2006.01) |
| *G06F 21/62* | (2013.01) |
| *H04L 9/06* | (2006.01) |

(52) U.S. Cl.
CPC .......... *H04L 9/3247* (2013.01); *G06F 21/629* (2013.01); *H04L 9/0643* (2013.01); *H04L 9/3297* (2013.01)

(58) Field of Classification Search
None
See application file for complete search history.

(56) References Cited

U.S. PATENT DOCUMENTS

| | | | | |
|---|---|---|---|---|
| 7,080,258 | B2 | 7/2006 | Kawasaki et al. | |
| 7,490,237 | B1* | 2/2009 | Morais | H04L 63/08 |
| | | | | 713/181 |
| 7,661,132 | B2* | 2/2010 | Ohkubo | G06Q 10/08 |
| | | | | 726/6 |
| 8,141,147 | B2* | 3/2012 | Sinclair | H04L 63/102 |
| | | | | 726/22 |
| 8,285,996 | B2* | 10/2012 | McCullagh | H04L 9/3247 |
| | | | | 713/180 |
| 8,332,641 | B2 | 12/2012 | Case et al. | |
| 8,397,078 | B2* | 3/2013 | Kusudo | H04N 21/40 |
| | | | | 455/3.02 |
| 8,438,621 | B2 | 5/2013 | Zhang et al. | |
| 8,869,288 | B2* | 10/2014 | Conley | G06F 21/10 |
| | | | | 726/28 |
| 9,147,052 | B2* | 9/2015 | Alkove | G06F 21/74 |
| 9,450,947 | B2 | 9/2016 | Messerges | |
| 9,942,049 | B2 | 4/2018 | McLean | |
| 10,049,353 | B2* | 8/2018 | Lopez | G06Q 20/326 |
| 11,444,784 | B2* | 9/2022 | Hatti | H04L 9/3234 |

(Continued)

FOREIGN PATENT DOCUMENTS

| | | | |
|---|---|---|---|
| CN | 103699037 | A | 4/2014 |
| CN | 103699037 | B | 6/2017 |
| CN | 110781478 | A | 2/2020 |

*Primary Examiner* — Maung T Lwin
(74) *Attorney, Agent, or Firm* — Peter J. Edwards

(57) ABSTRACT

A device receives an access-key package. The access-key package comprises a signature. The device obtains a validation package. The validation package comprises a validation device ID and validation timestamp. The device validates the signature in the access-key package. The device also obtains an updated timestamp. The device then compares the validation timestamp to the updated timestamp.

15 Claims, 6 Drawing Sheets

(56) References Cited

U.S. PATENT DOCUMENTS

| | | | | |
|---|---|---|---|---|
| 2002/0169961 | A1* | 11/2002 | Giles | G06F 21/6218 |
| | | | | 713/175 |
| 2004/0098609 | A1* | 5/2004 | Bracewell | H04L 67/02 |
| | | | | 726/6 |
| 2004/0143745 | A1* | 7/2004 | Margolus | G06F 21/6272 |
| | | | | 713/176 |
| 2005/0108551 | A1* | 5/2005 | Toomey | H04L 9/3297 |
| | | | | 713/185 |
| 2005/0207578 | A1* | 9/2005 | Matsuyama | H04N 7/173 |
| | | | | 348/E7.071 |
| 2010/0191970 | A1* | 7/2010 | Singer | H04L 9/0869 |
| | | | | 713/171 |
| 2013/0191647 | A1* | 7/2013 | Ferrara, Jr. | G16H 10/60 |
| | | | | 713/186 |
| 2014/0351596 | A1* | 11/2014 | Chan | H04L 63/0876 |
| | | | | 713/170 |
| 2016/0013944 | A1* | 1/2016 | Offenberg | H04L 9/3247 |
| | | | | 713/176 |
| 2019/0141041 | A1* | 5/2019 | Bhabbur | G06F 21/62 |
| 2019/0281089 | A1 | 9/2019 | Zehler et al. | |
| 2020/0314095 | A1* | 10/2020 | Jentzsch | H04L 63/101 |
| 2020/0336481 | A1* | 10/2020 | Fan | H04L 63/0876 |
| 2022/0029822 | A1* | 1/2022 | Ubbens | H04L 9/3247 |

\* cited by examiner

AUTHENTICATED ELEVATED ACCESS REQUEST

BACKGROUND

The present disclosure relates to device security, and more specifically, to unlocking access to device features.

The proportion of electronic devices that run on some level of on-board software is continually increasing. For example, many components that typically have operated on simpler circuitry now operate their own firmware. For some of these devices, the software on the device does not allow consumer access to all features of the device software in typical consumer operation.

There can be various reasons to unlock aspects of a device. In these instances, device software often needs to be unlocked before issues with the device can be troubleshooted. Some devices require device software to be unlocked before certain performance modes (e.g., overclocking) can be accessed. Some devices require device software to unlocked before resources on the device (e.g., protected memory) can be accessed.

SUMMARY

Some embodiments of the present disclosure can be illustrated as a method comprising obtaining an access-request package from a device. The access-request package comprises a request device ID and a request timestamp. The method also comprises transmitting the access-request package to a trusted authority. The method also comprises receiving an access-key package. The access-key package comprises a signature. The method also comprises obtaining a validation package. The validation package comprises a validation device ID and validation timestamp. The method also comprises validating the signature in the access-key package. The method also comprises obtaining an updated timestamp. Finally, the method comprises comparing the validation timestamp to the updated timestamp.

Some embodiments of the present disclosure can be also illustrated as a method comprising receiving, from a requester, an access-request package for a device. The method also comprises confirming that the requester is associated with the device. The method also comprises confirming that the requester is authorized to access the requested feature of the device. The method also comprises hashing the access-request package. This hashing results in a hashed access-request package. The method also comprises encrypting the hashed access-request package. This encrypting results in a signature. Finally, the method comprises transmitting the signature to the requester.

Some embodiments of the present disclosure can also be illustrated as a system. The system comprises a processor and a memory that is in communication with the processor. The memory contains program instructions. When the program instructions are executed by the processor, they cause the processor to perform a method. The method comprises receiving an access-key package. The access-key package comprises a signature. The method also comprises obtaining a validation package. The validation package comprises a validation device ID and validation timestamp. The method also comprises validating the signature in the access-key package. The method also comprises obtaining an updated timestamp. Finally, the method also comprises comparing the validation timestamp to the updated timestamp.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
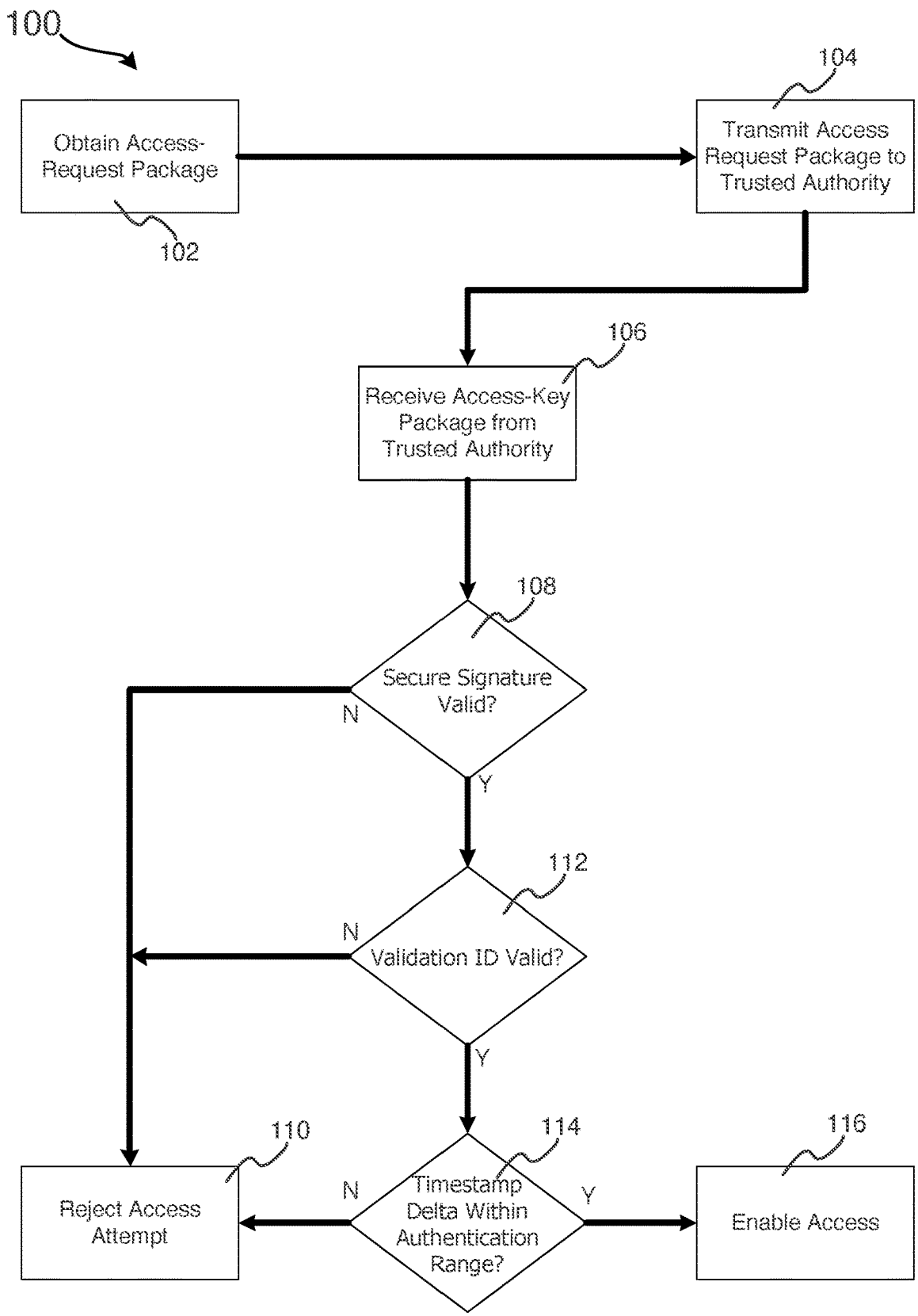
FIG. 1 depicts a method of enabling access to an elevated privilege using an access-key package, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to device security, and more specifically, to unlocking access to device features. While the present disclosure is not necessarily limited to such applications, various aspects of the disclosure may be appreciated through a discussion of various examples using this context.

Enabling access to elevated privileges on a device can be used for several reasons, depending on the circumstances and device properties. "Elevated privileges," as used herein, may refer to any feature of a device that is not normally accessible by default to a consumer without performing some unlocking process. For example, some devices include a built-in "debug" mode, in which various aspects of the device software become accessible in order to troubleshoot operating problems with the device. Some such devices require that this "debug" mode be unlocked with a special device, procedure, password, or remote command in order to avoid security risks caused by unauthorized access to those aspects that the "debug" mode makes available. Similarly, some devices include modes of operation that, if activated, can increase device performance in exchange for device security or stability. Some such devices may require that these modes be unlocked only if the user of the device confirms understanding of the risks involved. In some instances, an "elevated privilege" may even include the ability to use the basic functions of a device. For example, if a device is being leased, the device may be unlocked for use by a remote system (e.g., the manufacture of the device) if the user of the device (the lessee) has paid the applicable subscription fees.

In light of the varied uses for enabling access to elevated privileges, it is unsurprising that several different methods of enabling access to those elevated privileges also exist. However, despite the variations in these methods, several disadvantages exist in typical methods. For example, many methods lack the ability to control who has access to the elevated privileges, and for how long they have access. Some methods enable access to elevated privileges by utilizing a secondary physical device that, when plugged into a user device, enables the desired access in that user device. A device vendor, for example, may equip field technicians with devices that can be plugged into end-user devices to access protected memory or features on the device (e.g., a debug mode). However, this can be insecure because some such physical devices can be duplicated, sold, or lost. Further, if a disgruntled technician leaves the employment of the device vendor, that disgruntled technician could abuse the secondary physical device to gain access to various end-user devices in an unauthorized manner. Once control of such a physical device is lost by the device vendor, a significant security risk may result.

Further, some methods lack the ability to automatically disable the access to elevated privileges if changes in circumstances suggest that those elevated privileges should no longer be available. This can become an issue, for example, if a user who is authorized to access an elevated privilege forgets to disable that access after using the device, the elevated privilege may remain accessible well after the authorized user is finished accessing it. For example, a technician may unlock the bootloader of a device while troubleshooting issues with the device, fix those issues, then neglect to lock the bootloader when the issues have been repaired. In this example, the device may be a considerable security risk if a malicious actor gains access to the device.

For these reasons, some methods of enabling access include establishing a secure link between a device and a remote network server and controlling the access using that link. For example, in order to enable an "unlocked" mode of a device, a vendor may require the device to connect (for example, over the Internet) to a server operated by the vendor and establish a secure link. Upon establishment of that secure link, the server may enable access to the elevated privilege on the device. Due to the requirement of the secure link, added control is possible through these methods, as the access to the elevated privilege may be disabled by a remote command from the vendor. However, relying on the establishment and maintenance of a secure link to enable access of elevated privileges requires that the device be in a location in which continuous network connection is possible. For these reasons, some such methods do not automatically disable access if the secure link is broken, but rather may use a secure link to establish access that automatically is disabled at the end of a timer on the device. However, by enabling access to an elevated privilege after the secure link is broken, control over the access is reduced. Even if, for example, a timer is utilized on the device to automatically revoke access after the expiration of the timer, these timers are typically simple and can be manipulated while the device is unlocked. This manipulation may enable a malicious user of the device to maintain access to the elevated privilege after the access was intended to terminate.

For this reason, some methods automatically terminate access to elevated privileges if access to a server through a secure link is broken (for example, if the device loses Internet capability). However, these methods also feature disadvantages. If the device is in a remote location, for example, or if the device is in an area of a building with poor connection to a wireless network, it may be unfeasible to maintain a link to the server for anything more than a short period of time. In these instances, troubleshooting a device issue may become infeasible or impossible due to the access to the necessary privileges dropping frequently.

Further, relying on the establishment and maintenance of a secure link between a device and server may limit the ability to enable access to elevated privileges on devices that do not have the capability to make a network connection. This may be the case, for example, if the design of the device is too basic to establish a network connection (for example, if the device does not have a TCP/IP stack or wireless antenna) or if the network capabilities of the device are malfunctioning.

For these reasons, the ability to enable access to an elevated privilege without establishing a link to that device, while still maintaining the ability to control access to that privilege, is desired.

Some embodiments of the present disclosure address some of the above issues by enabling and controlling access to elevated privileges using an access-key package. In some embodiments, these access-key packages embed a unique identifier of the device and a timestamp of the access request in a secure, cryptographic signature. In some embodiments, for example, enabling access to a privilege may include sending a device ID and timestamp, obtained from a user device, to a server operated by a trusted authority (e.g., a vendor or authority engaged by that vendor) in an access-request package. That trusted authority may then determine whether the transmitter of the access-request package is associated with the device (e.g., registered as the device owner, a technician of the vendor) and is authorized to access the privilege. If the transmitter of the request is both associated and authorized, the trusted authority may package the device ID and timestamp from the access-request package into a secure signature. For example, the trusted authority may combine the device ID and timestamp into one data object, hash the data object, and encrypt the hash using the vendor's private key.

Once the trusted authority has prepared the secure signature, the trusted authority may send the secure signature back to the transmitter in an access-key package. In some embodiments, this access-key package may also contain the device ID and timestamp from the access-request package. The transmitter can then attempt to use the access-key package to enable access to the elevated privilege. For example, the transmitter could input the secure signature to the device.

The device may then either reject the access attempt or enable access by validating the secure signature. For example, the device could hash the device ID and the original timestamp (for example, from the access-key package), decrypt the secure signature using the vendor's public key, and comparing the two resulting hashes. If the two resulting hashes match, the device can conclude with confidence that the secure signature originated from the trusted authority, which reviewed the device ID and confirmed that the attempt to access the privilege was legitimate.

In some embodiments, the device may also confirm that the device ID is valid by confirming that the device ID in the access-key package matches the device ID of the device. The device may, for example, simply compare the device ID that is on board the device (e.g., in a device memory) with the device ID that was returned with the access-key package. If the device ID does not match, the device may conclude that the secure signature was prepared for a different device, and reject the access attempt.

In some embodiments, the device may also confirm that the access to the elevated privilege is timely. For example, the device may subtract the original timestamp returned with the access-key package from a current, updated timestamp on the device, resulting in a timestamp delta (i.e., a difference between the two timestamps). The device may then compare that timestamp delta with a window during which access to elevated privileges are permitted. For example, the window may be between 0 minutes and 1440 minutes (i.e., 1 day). If the timestamp delta is less than that window (i.e., the delta is negative) the original timestamp would be later than the current timestamp, signifying that one of the timestamps has been tampered with. On the other hand, if the timestamp delta is greater than that window (i.e., above 1440 minutes), the permission to access the elevated privilege may be expired. In either instance, the device may reject access to the elevated privilege. If, on the other hand, the timestamp delta is within the window, access may be granted.

In some embodiments, the device may also periodically repeat some or all of the above validation procedures. For example, in some embodiments, the device may calculate a new timestamp delta and compare the delta to the authorization window every 5 minutes. In this way, when the authorization expires, the device can withdraw access to the elevated privilege. This may prevent a device vulnerability due to an authorized user forgetting to disable access, and may prevent a malicious user from gaining long-term access to an unlocked device. Further, because the access-key package itself would not need to be updated in order to re authenticate the access request, the device could renew or disable access without any need of a network link to a vendor.

FIG. 1 depicts a method 100 of enabling access to an elevated privilege using an access-key package, in accordance with embodiments of the present disclosure. Method 100 is presented from the perspective of a user device that is validating an attempt to enable access to an elevated privilege. However, in some embodiments, some operations discussed with respect to method 100 may be performed by a user or administrator who is attempting to enable access to the privilege or by another device operated by such a user. These actions have been illustrated in FIG. 1 for the sake of understanding.

Method 100 begins in block 102, in which an access-request package is obtained. In some embodiments, obtaining the access-request package may take the form of loading a device ID for the device and a timestamp from the device clock. For example, a device ID may be stored on a memory of the device, and may include, depending on the circumstances, a device serial number, a universal unique ID, a worldwide unique ID, etc. Any series of characters that may be used to uniquely identify the device may be used. For example, the device may include a random number generator that, when prompted by a user or administrator, generates a number that can be used to uniquely identify the device.

In some implementations, it may be beneficial for the memory on which this device ID is stored to be resistant to alteration. This may avoid, for example, the device ID being changed by a malicious actor to a different device ID in order to convince the device that a trusted authority has approved a request for an elevated privilege for that device, rather than for the different device. For example, while it would be possible for a device ID to be stored on a battery-powered random access memory, storing the device ID on an immutable memory, such as eFuses or manufacturing registers that are unique to the particular device, may prevent tampering with the device ID.

Block 102 may also include obtaining a timestamp for the time during which the access-request package was obtained. This timestamp may originate from the onboard clock of the device, and may be packaged with the device ID in the request package. In some embodiments, the timestamp may not directly originate from the device's onboard clock, but from a trusted clock that is synced with a clock on the device. Thus, in some embodiments, "obtaining" the access-request package may include obtaining the device ID and the timestamp from the device and packaging them together, resulting in an access-request package.

Method 100 continues in block 104, in which the access-request package is transmitted to a trusted authority. This trusted authority may be, for example, a vendor of the device, service provider for the device, an integrator of a system into which the device is installed, or a third party hired by any of the above. The nature of the transmission may vary based on the circumstances. In some embodiments, for example, the requester may transmit the access-request package over a proprietary protocol over the internet or a cellular connection. In some embodiments, the requester may email the access request package to the trusted authority. In other embodiments, the requester may store the access request package on a portable storage drive that is physically transported to the trusted authority. The medium of transmission may not be important as long as the trusted authority is able to receive and analyze transmissions of that medium. For example, if the trusted authority is able to receive and analyze punch cards, the requester could punch out the device ID and timestamp on a set of punch cards and mail them to the trusted authority.

With the access-request package, the trusted authority may identify the device and determine whether the party that transmitted the access-request package is associated with the device. The requirements for being "associated" with the device may vary based on the circumstances. For example, if the party is registered as the device owner, the party may be associated with the device. The party may also be an employee of the owner or an independent contractor hired by the owner. The party may also be a technician hired by the vendor to troubleshoot an issue with the device.

If the trusted authority determines that the requester is associated with the device, the trusted authority may also determine whether the requester is authorized to access the elevated privilege. For example, it is possible that an owner of a device could request that a device be unlocked and for factory reset. However, vendor may only allow technicians to perform factory resets on end-user devices, and thus the trusted authority may determine that the requester is not authorized to access the elevated privilege.

However, if the trusted authority determines that the requester is both associated with the device and authorized to access the elevated privilege, the trusted authority may convert the device ID and timestamp into a secure signature. The form of this secure signature may vary based on the implementation, but typical implementations would utilize a cryptographic system (sometimes referred to as a "cryptosystem" that creates a secure package that can be validated using a cryptographic process. For example, the secure signature could be created using a Rivest-Shamir-Adleman ("RSA") cryptosystem, a Digital Signature Algorithm ("DSA") standard, or an Elliptic Curve Digital Signature Algorithm ("ECDSA") variant of the DSA standard.

For example, the trusted authority may combine the device ID and timestamp into a single data object, hash that data object, then encrypt that hash with the trusted authority's (e.g., the vendor's) private key. This may signify that the trusted authority has reviewed the access-request package and confirmed that the requester should be granted access to the elevated privilege. The trusted authority may then package the secure signature into an access-key package and transmit the access-key package to the requester.

Thus, method 100 may continue in block 106, in which the device receives the access-key package from the trusted authority. In some embodiments, for example, the trusted authority may send the access-key package to the requester, who then inputs the access-key package into the device in an attempt to access an elevated privilege. The device may then analyze the access-key package to determine whether it contains authorization from the trusted authority that the elevated privilege should be enabled.

The device begins this analysis in block 108, in which the device validates the secure signature that was received in the access-key package. In some embodiments, validating the secure signature can involve 1) confirming that the secure signature was encrypted with the vendor's private key, and 2) confirming that the secure signature was created with the information from the access-request package. These two confirmations together may signify to the device that the trusted authority reviewed the access request package and concluded that the sender of the access request package should have access to the elevated privilege.

Validating the signature in block 108 may include, for example, hashing the device ID and timestamp and decrypting the secure signature with the trusted authority's public key. This may result in two hashes that should both have originated from the device's ID and timestamp. In other words, the hashes should be equal.

The device ID and timestamp that are hashed to validate the secure signature may be referred to herein as the "validation device ID" and "validation timestamp" respectively, and together may form the "validation package." In some embodiments, the validation package may have been included in the access-key package that was received in block 106 (i.e., the validation package may have been returned after the trusted authority created the secure signature from the device ID and timestamp). In some embodiments, the validation package may have been stored by the device in a space in memory on the device that is dedicated to securely storing the validation package.

If the device determines, in block 108, that the secure signature is not valid, the device could conclude that the access-key package is faulty. For example, the secure signature may have been created for another device (i.e., the access request package may have been created using another device's ID). In this example, the trusted authority may have concluded that the requester of "another device" was authorized to access the "another device," rather than the device performing block 108. In this example, a malicious actor may be attempting to use the access-key package that was obtained using another device's information to trick the device performing block 108. For example, a malicious actor may have modified the original validation package in the access-key package to match the device performing block 108. However, such a modification will result in a validation failure as the signature was created with a different validation package.

In another example, the secure signature may not be valid because it may not have been signed with the trusted authority's key. For example, if the access-request package transmitted in block 104 were intercepted by a malicious actor, that malicious actor could sign the access-request package with a different private key and attempt to unlock the device with the resulting signature.

If the device determines, in block 108, that the secure signature is not valid, the device rejects the access attempt in block 110. In some embodiments, this may take the form of notifying a user of the device. The specifics of this notification may depend on the capabilities of the device. If the device has a speaker, for example, the device could play an error sound through the speaker. If the device has a visual display, the device could display an error message on the display. If the device has an indicator light, the device could flash an error code (e.g., a series of flashes in a predetermined pattern). In some embodiments, however, the device could simply ignore the attempt in block 110, in which case no notification to the user may be provided.

If, on the other hand, the device determines, in block 108, that the secure signature is valid, the device may conclude that the secure signature in the access-key package was signed by the private key of the trusted authority. The device may also conclude, therefore, that the trusted authority analyzed an access-request package and concluded that the requester of that package was authorized to access an enhanced privilege on the device identified in the access-request package.

For this reason, the device may then proceed to block 112 in which the device determines whether the validation ID is valid. In other words, the device determines whether the device ID that was used to create the secure signature is valid is the device's device ID. The nature of this determination may vary based on the embodiment, however, the typical process would be for the device ID to compare its ID with the validation ID that was used to validate the secure signature.

For example, if the access-key package contained the validation ID, and that validation ID was hashed with the timestamp and compared with the decrypted signature in block 108, block 112 may compare that validation ID to a device ID that is stored on the device. However, if the access-key package only contained the secure signature, the validation ID may have been stored on the device itself. In that case, the validation ID may have been obtained from the same exact location as the device ID was obtained in block 102, in which case no further validation of the device ID may be necessary.

If the device determines, in block 112, that the validation device ID is not valid, the device may reject the access attempt in block 110. If, however, the device determines, in block 112, that the device's ID matches the validation ID, then the device may proceed to block 114, in which the device determines whether timestamp delta is within an authentication window. The timestamp delta, in typical embodiments, may represent how long ago the access request originated. For example, block 114 may include obtaining an updated timestamp from the device and subtracting the validation timestamp from the updated timestamp, resulting in a timestamp delta. The timestamp delta may, in method 100, signify the amount of time that had passed since the original timestamp was obtained in block 102. In some embodiments, this timestamp delta may be compared to an authentication range (e.g., a lower threshold and an upper threshold).

This authentication range may represent the amount of time that the requester of the elevated privilege is authorized to use that elevated privilege. If the timestamp delta is greater than the authentication range, for example, the device could conclude that the time during which the requester was authorized to access the elevated privilege has already expired. On the other hand, if the timestamp delta is less than the authentication range, the device could conclude that the validation timestamp (or the device timestamp) has been altered, because the "current" timestamp (i.e., the updated timestamp) is less than (less current) than the timestamp created in block 102.

If the device determines, in block 114, that the timestamp delta is not within the authentication range (for example, either below the lower threshold or above the upper threshold), the device rejects the access attempt in block 110. However, if the device determines, in block 114, that the timestamp delta is within the authentication range, the device may conclude that the requester who sent the access-request package in block 104 was determined to be authorized to access the elevated privilege by the trusted authority. Thus, the device may enable access in block 116. The access that is enabled in block 116 may depend on the device and circumstance, but any privilege level that may require vendor (or similar entity) approval may qualify. For example, block 116 may include unlocking the device into debug mode or other unlocked mode, activating a high-performance mode, overclocking the device, unlocking a bootloader, performing a factory reset, or allowing a subscription-based device to function.

In some embodiments of method 100, it may be beneficial to periodically repeat block 114, and potentially 108 and 112, to determine whether the requester is still authorized to access the elevated privilege. By periodically repeating blocks 108 through 114, for example, the device could identify when the timestamp delta grew above the authentication range. This may be beneficial, for example, in detecting instances of a requester forgetting to disable access to the privilege, detecting a technician unlocking a device at a vendor's location, but forgetting to lock it again before returning the device to the field, and detecting a requester attempting to access the privilege after the requester's allowance of that privilege has expired.

Figure 2A:
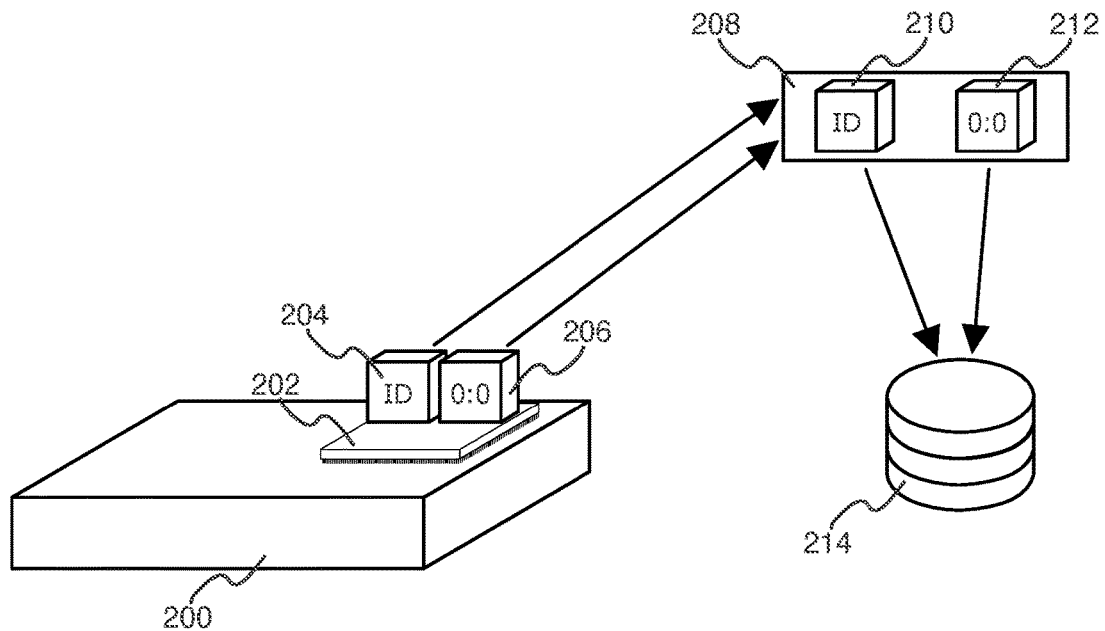
FIG. 2A depicts a simplified diagram of a first embodiment of transmitting a request for an access-key package to a trusted authority.

For the sake of understanding, FIGS. 2A-4B depict simplified diagrams of three different methods by which an access-request package could be transmitted to a trusted authority and by which an access-key package could be returned to a device. FIG. 2A, for example, depicts a first embodiment of transmitting a request for an access-key package to a trusted authority. FIG. 2A depicts device 200, which includes a memory 202 that holds a device ID 204 and a device timestamp 206 from a device clock. In FIG. 2A, device ID 204 and device timestamp 206 are added to access-request package 208, resulting in request device ID 210 and request timestamp 212. Of note, request ID 210 and request timestamp 212 are copies of device ID 204 and device timestamp 206. In FIG. 2A, a requester sends access-request package 208 to a trusted authority 214.

Figure 2B:
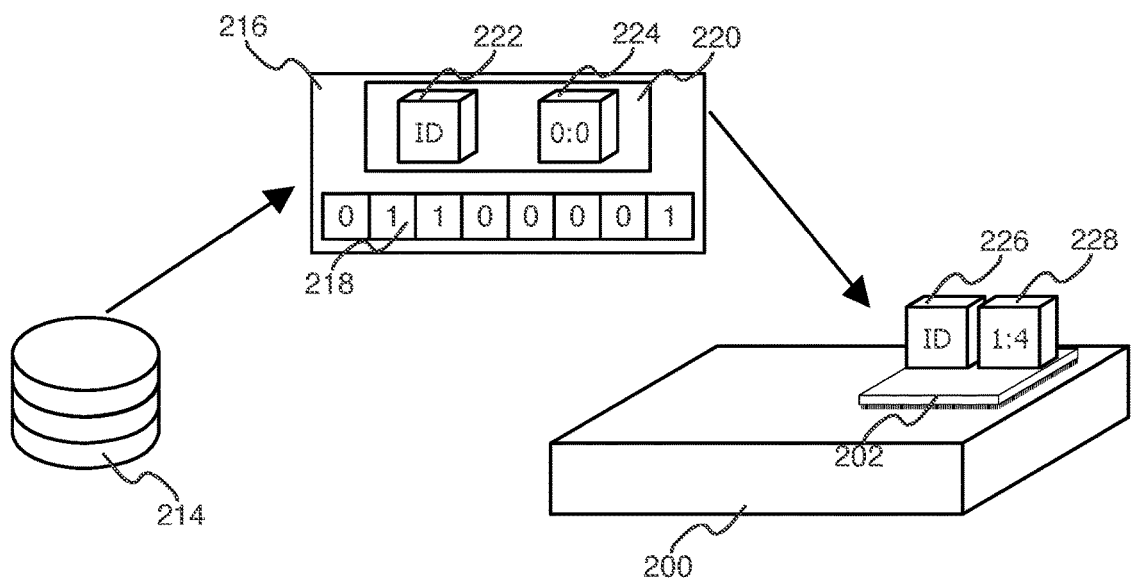
FIG. 2B depicts a simplified diagram of a first embodiment of receiving an access-key package from a trusted authority.

FIG. 2B depicts a simplified diagram of a first embodiment of receiving an access-key package from a trusted authority. Upon determining that the requester is authorized to access an elevated privilege, trusted authority 214 creates access-key package 216, which includes a secure signature 218, and validation package 220, which contains validation device ID 222 and validation timestamp 224. Validation package 220 may be a combination of validation device ID 222 and validation timestamp 224. Secure signature 218, on the other hand, may be a hash of validation package 220 (i.e., the combined components of access-request package 208) that was encrypted with trusted authority's 214 private key. Of note, the sequences of 0s and 1s depicted as part of secure signature 218 are abstract representations for the sake of understanding. The precise form of secure signature 218 may vary based on the form of validation package 220 (i.e., the forms of validation device ID 222 and validation timestamp 224) and the signature process used by trusted authority 214.

Trusted authority 214 transmits access-key package 216 to device 200 in FIG. 2B. Device 200 could then validate secure signature 218 by decrypting it using trusted authority's 214 public key and comparing the result to a hash of validation package 220. If the results match, device 200 may conclude that the secure signature was created by the trusted server. Device 200 may then compare updated device ID 226 with validation ID 222 to validate validation ID 222. Of note, updated device ID 226 may be the same data in memory 202 as device ID 204, just at a later time. Device 200 may then subtract validation timestamp 224 from updated timestamp 228, resulting in a timestamp delta. Device 200 could then determine whether the timestamp delta is within an authentication range.

Figure 3A:
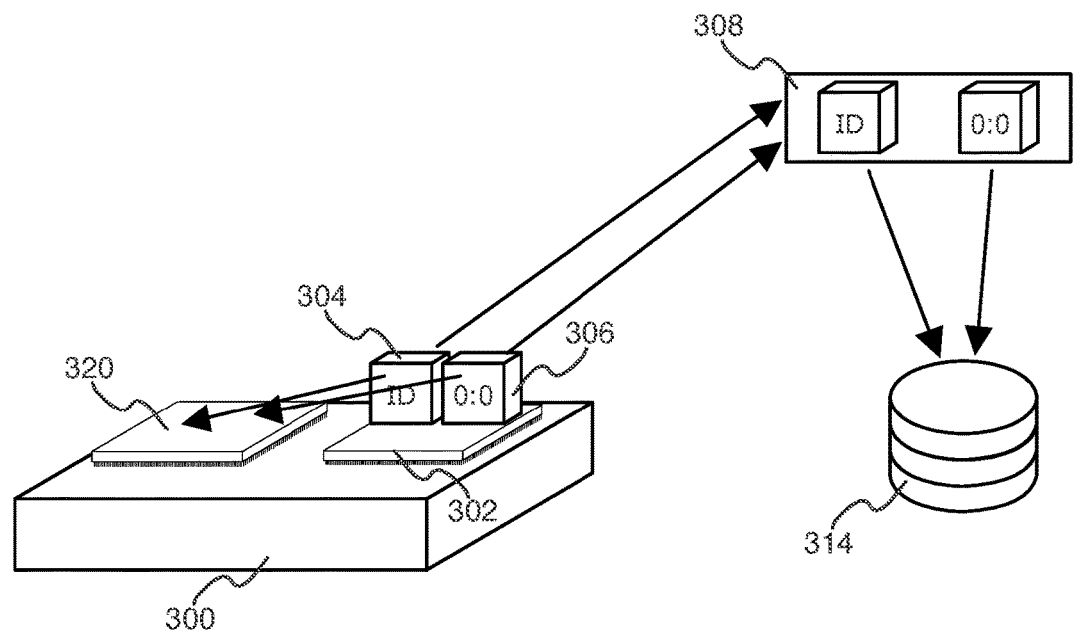
FIG. 3A depicts a simplified diagram of a second embodiment of transmitting a request for an access-key package to a trusted authority.
Figure 3B:
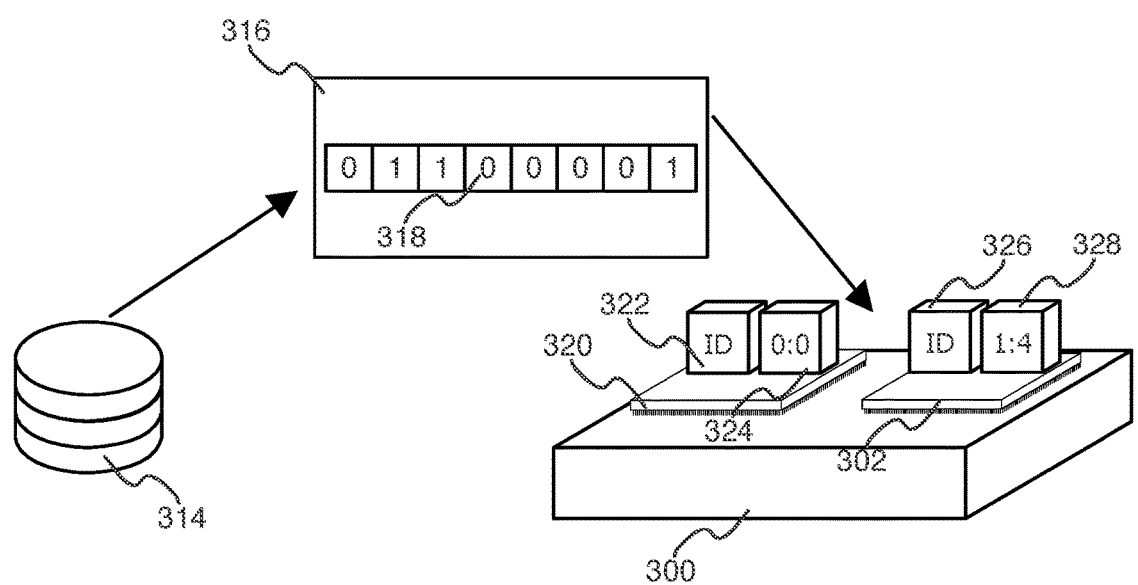
FIG. 3B depicts a simplified diagram of a second embodiment of receiving an access-key package from a trusted authority.

FIG. 3A depicts a simplified diagram of a second embodiment of transmitting a request for an access-key package to a trusted authority. The process followed in FIGS. 3A and 3B is similar to the process followed in FIGS. 2A and 2B. For example, device 300 contains memory 302 with device ID 304 and device timestamp 306. However, device 300 also contains an additional memory space, memory 320. As illustrated in FIG. 3A, when device 300 adds device ID 304 and device timestamp 306 to access-request package 308, it also copies them to memory 320 in a dedicated space for validation. As such, those copies become validation device ID 322 and validation timestamp 324, illustrated in FIG. 3B.

In FIG. 3B, trusted authority 314 creates access-key package 316, which contains only secure signature 318. It would be possible for access-key package 316 to also contain a validation package, but the presence of validation device ID 322 and validation timestamp 324 may make that unnecessary. When validating secure signature 318, device 300 could hash validation device ID 322 and validation timestamp 324, which has not changed since FIG. 3A. When calculating a timestamp delta, device 300 may subtract validation timestamp 324 from updated timestamp 328. Device 300 may not determine whether validation ID 322 is valid, because it is a copy of device ID 304 and has been in device 300's memory.

Figure 4A:
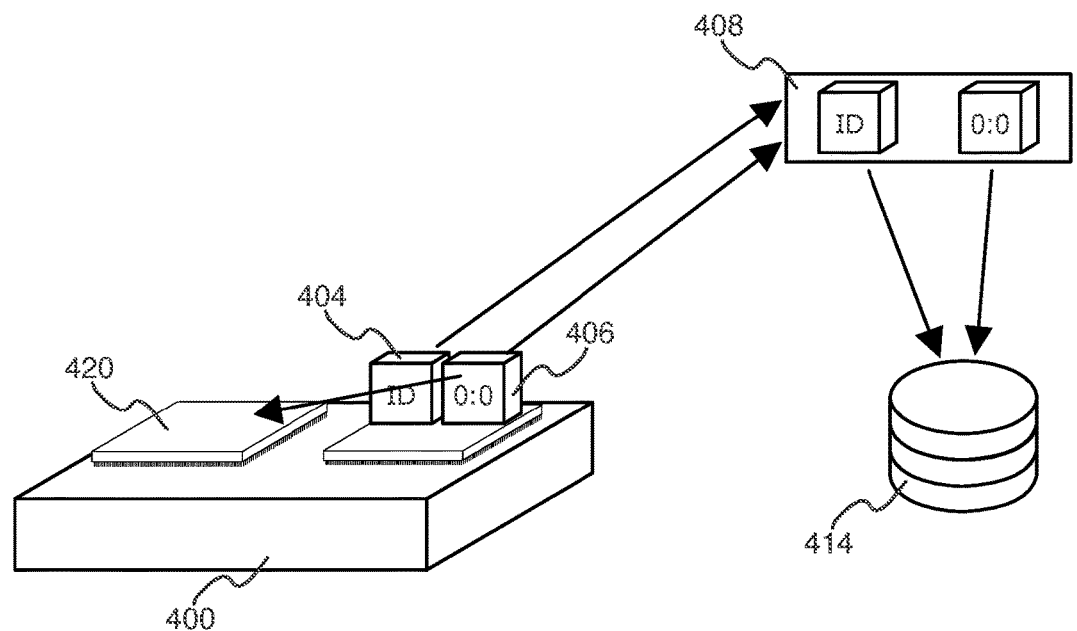
FIG. 4A depicts a simplified diagram of a third embodiment of transmitting a request for an access-key package to a trusted authority.
Figure 4B:
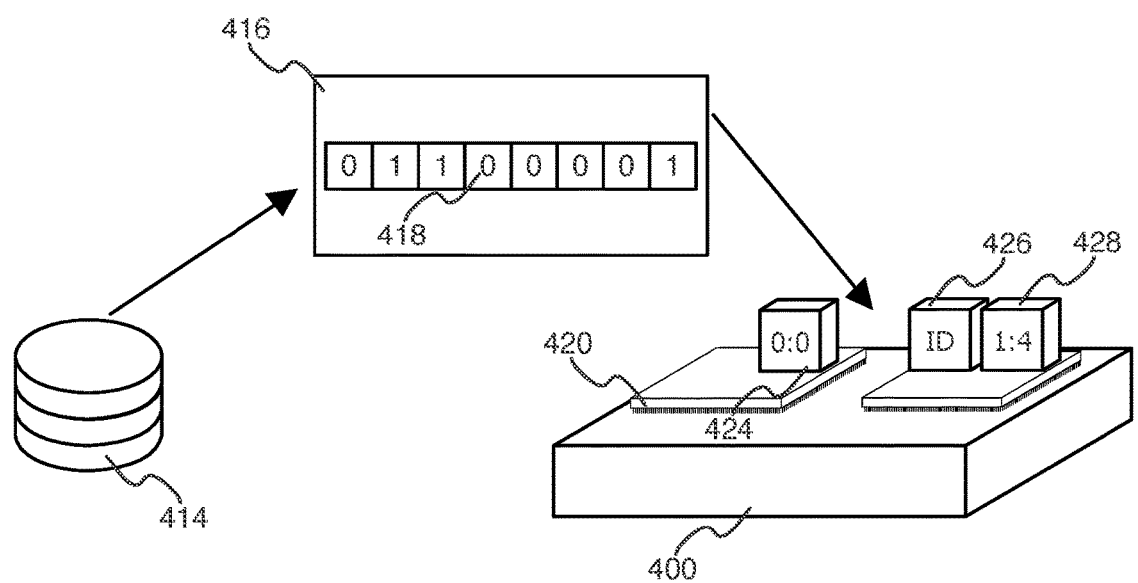
FIG. 4B depicts a simplified diagram of a third embodiment of receiving an access-key package from a trusted authority.

FIG. 4A depicts a simplified diagram of a third embodiment of transmitting a request for an access-key package to a trusted authority. The process followed in FIGS. 4A and 4B is similar to the processed followed in FIGS. 2A-3B. For example, in FIG. 4A, device 400 copies device timestamp 406 to memory 420 when copying device ID 404 and device timestamp 406 to access-request package 408. Access-key package 426, created by trusted authority 414, contains only secure signature 418. Memory 420 comprises validation timestamp 424. However, while memory 420 does not contain a validation device ID, updated device ID 426 can serve as a validation device ID. Validation timestamp 424 can be subtracted from updated timestamp 428 to create a timestamp delta.

Figure 5:
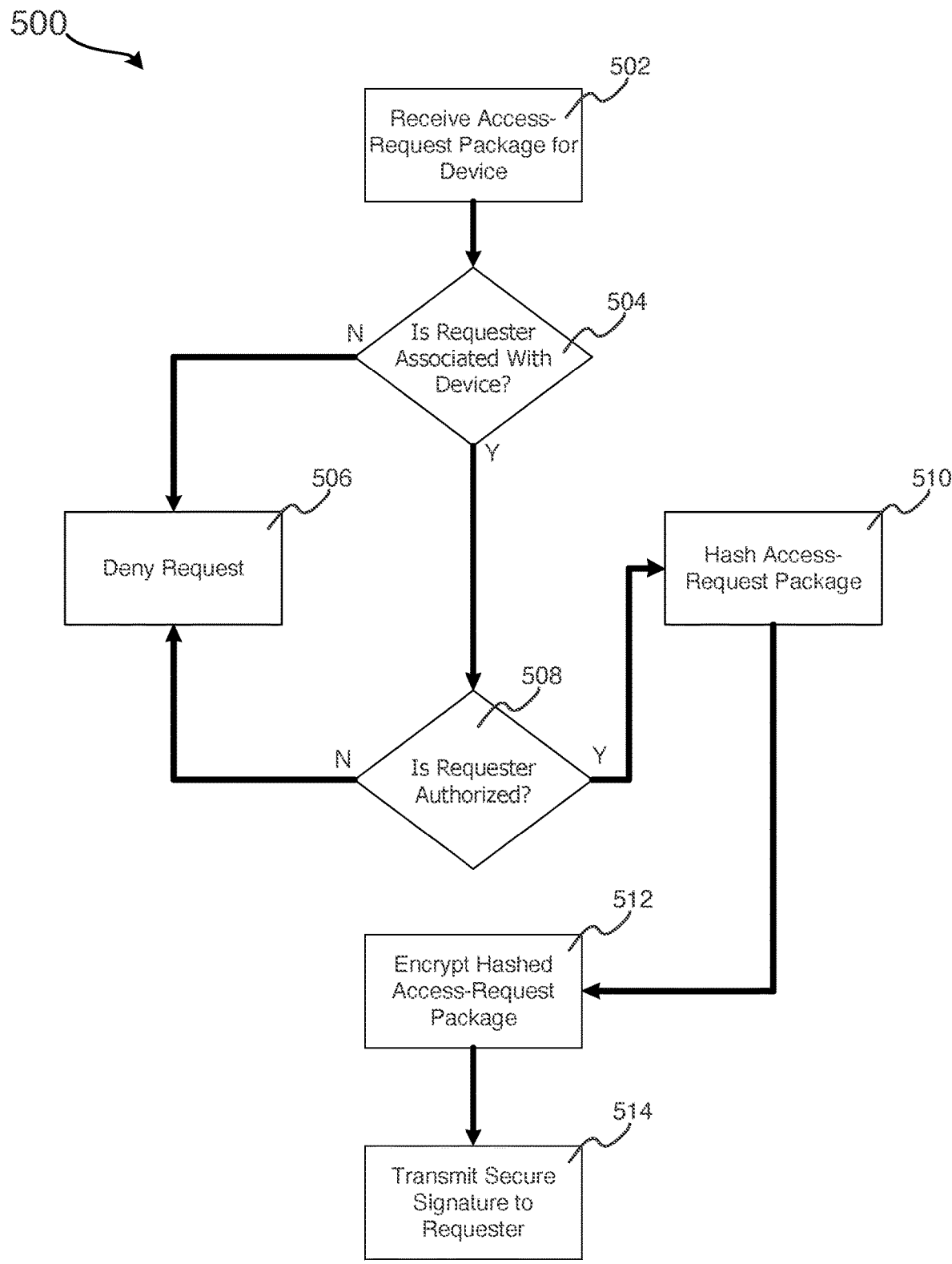
FIG. 5 depicts a method of processing a request for an access-key package, in accordance with embodiments of the present disclosure.

FIG. 5 depicts a method 500 of processing a request for an access-key package by a trusted authority, in accordance with embodiments of the present disclosure. Method 500 could be used, therefore, by a trusted authority to determine whether a requester of access to an enhanced privilege should be enabled to access that privilege. Method 500 begins in block 502, in which the trusted authority receives an access-request package for a particular device. In some embodiments, the access-request package may resemble the access-request packages discussed with respect to block 104 of FIG. 1 and access-request packages 208, 308, and 408.

Upon receiving the access-request package in block 502, the trusted authority may determine, in block 504, whether the requester that transmitted the access-request package is associated with the device. For example, the trusted authority may attempt to identify whether the requester is an employee of the device owner, or the actual device owner.

If the trusted authority determines, in block 504, that the requester is not associated with the device, the trusted authority concludes that the requester should not have access to elevated privileges for the device, and denies the request in block 506. In some embodiments, the trusted authority may simply ignore the access-request package in block 506. In other embodiments, the trusted authority may send an error message to the requester, or to the owner of the device.

If the trusted authority determines, on the other hand, that the requester is associated with the device, the trusted authority determines, in block 508, whether the requester is authorized to access the enhanced privilege. Block 508 may include, for example, determining whether the requester is a technician employed by the device vendor, or a device owner who has paid the necessary subscription fees to utilize the enhanced-privilege features of the device. In some embodiments, the analysis of block 508 may be combined with the analysis of block 504, and thus the consideration of whether a requester is authorized to access an enhanced privilege may include the consideration of whether the requester is associated with the device.

If the trusted authority determines, in block 508, that the requester is not authorized to access the enhanced privilege, the trusted authority denies the request in block 506. If, on the other hand, the trusted authority determines that the requester is authorized, the trusted authority proceeds to hash the access-request package in block 510. In typical embodiments, this would include hashing a timestamp and a device ID together, resulting in a single hash. The trusted authority may then encrypt the resulting hash using the trusted authority's private key in block 512. This would result in a secure signature, which could then be packaged in an access-key package and transmitted to the requester in block 514. The requester could then input the secure signature into the device, which could then begin to validate the signature (for example, by using the process discussed with respect to blocks 106 though 116).

Figure 6:
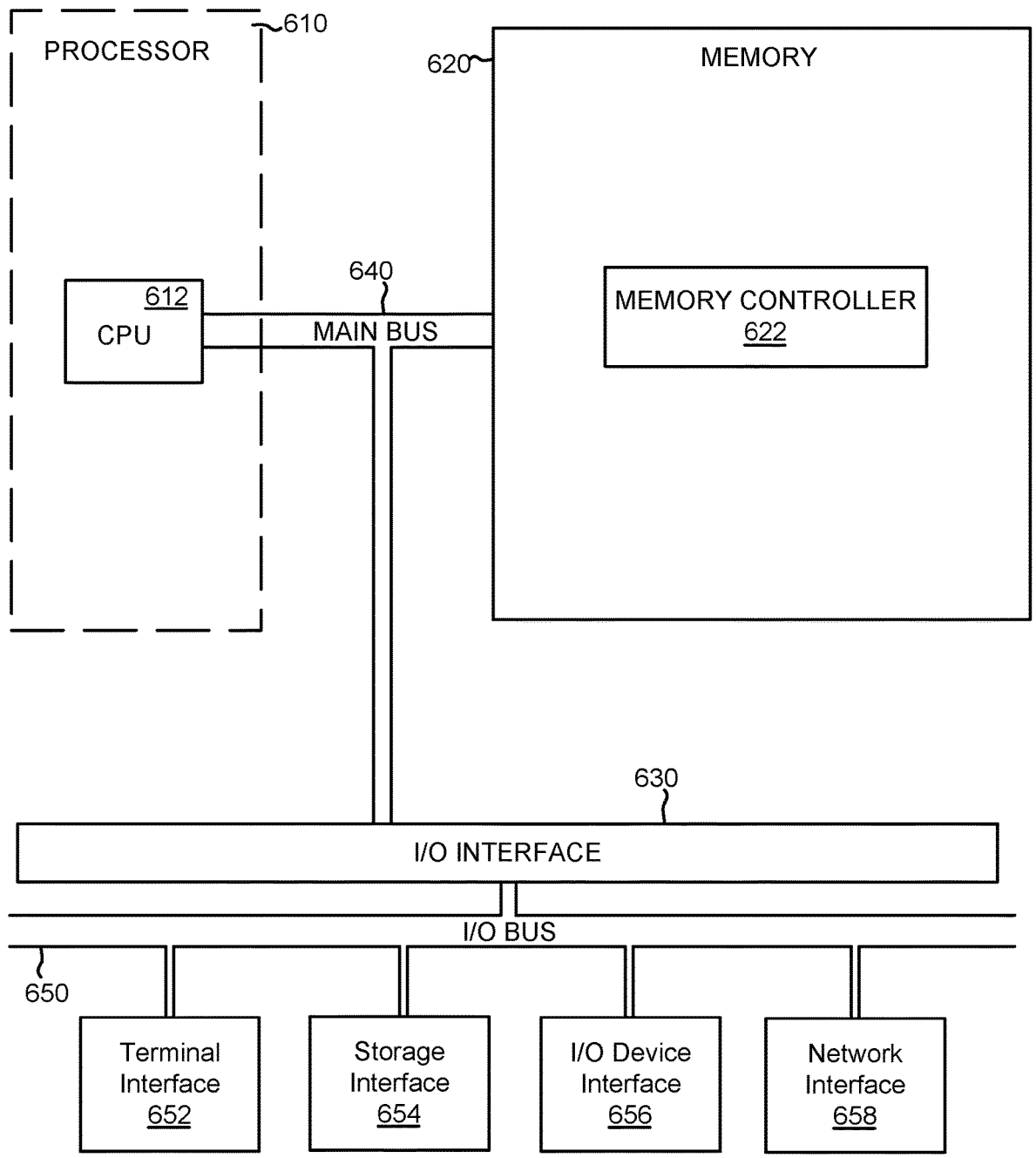
FIG. 6 depicts the representative major components of a computer system that may be used in accordance with embodiments.

FIG. 6 depicts the representative major components of an example Computer System 601 that may be used in accordance with embodiments of the present disclosure. The particular components depicted are presented for the purpose of example only and are not necessarily the only such variations. The Computer System 601 may include a Processor 610, Memory 620, an Input/Output Interface (also referred to herein as I/O or I/O Interface) 630, and a Main Bus 640. The Main Bus 640 may provide communication pathways for the other components of the Computer System 601. In some embodiments, the Main Bus 640 may connect to other components such as a specialized digital signal processor (not depicted).

The Processor 610 of the Computer System 601 may include one or more CPUs 612. The Processor 610 may additionally include one or more memory buffers or caches (not depicted) that provide temporary storage of instructions and data for the CPU 612. The CPU 612 may perform instructions on input provided from the caches or from the Memory 620 and output the result to caches or the Memory 620. The CPU 612 may include one or more circuits configured to perform one or more methods consistent with embodiments of the present disclosure. In some embodiments, the Computer System 601 may contain multiple Processors 610 typical of a relatively large system. In other embodiments, however, the Computer System 601 may be a single processor with a singular CPU 612.

The Memory 620 of the Computer System 601 may include a Memory Controller 622 and one or more memory modules for temporarily or permanently storing data (not depicted). In some embodiments, the Memory 620 may include a random-access semiconductor memory, storage device, or storage medium (either volatile or non-volatile) for storing data and programs. The Memory Controller 622 may communicate with the Processor 610, facilitating storage and retrieval of information in the memory modules. The Memory Controller 622 may communicate with the I/O Interface 630, facilitating storage and retrieval of input or output in the memory modules. In some embodiments, the memory modules may be dual in-line memory modules.

The I/O Interface 630 may include an I/O Bus 650, a Terminal Interface 652, a Storage Interface 654, an I/O Device Interface 656, and a Network Interface 658. The I/O Interface 630 may connect the Main Bus 640 to the I/O Bus 650. The I/O Interface 630 may direct instructions and data from the Processor 610 and Memory 620 to the various interfaces of the I/O Bus 650. The I/O Interface 630 may also direct instructions and data from the various interfaces of the I/O Bus 650 to the Processor 610 and Memory 620. The various interfaces may include the Terminal Interface 652, the Storage Interface 654, the I/O Device Interface 656, and the Network Interface 658. In some embodiments, the various interfaces may include a subset of the aforementioned interfaces (e.g., an embedded computer system in an industrial application may not include the Terminal Interface 652 and the Storage Interface 654).

Logic modules throughout the Computer System 601—including but not limited to the Memory 620, the Processor 610, and the I/O Interface 630—may communicate failures and changes to one or more components to a hypervisor or operating system (not depicted). The hypervisor or the operating system may allocate the various resources available in the Computer System 601 and track the location of data in Memory 620 and of processes assigned to various CPUs 612. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:

obtaining an access-request package from a first memory on a device, wherein the access-request package comprises a request device identifier ("ID") and a request timestamp;

transmitting the access-request package to a trusted authority;

receiving an access-key package, wherein the access-key package comprises a signature;

obtaining a validation package from a second memory on the device, wherein the validation package comprises a validation timestamp and wherein the validation timestamp is based on the request timestamp;

validating the signature in the access-key package;

obtaining an updated timestamp from the first memory on the device;

comparing the validation timestamp to the updated timestamp;

determining, based on the comparing, whether a timestamp delta between the validation timestamp and the updated timestamp is within an authorization window; and making an authentication decision based on the determining and the validating.

2. The method of claim 1, wherein the signature was created by encrypting a hashed version of the request timestamp, wherein the validation package consists of the validation timestamp, and wherein the validating comprises:

hashing the validation package, resulting in a hashed validation package;

decrypting the signature, resulting in a decrypted signature; and comparing the decrypted signature and the hashed validation package.

3. The method of claim 1, further comprising:

storing, after the transmitting, the access-request package on the device, resulting in the validation package;

wherein the validation timestamp is the request timestamp and wherein the validation package also comprises the request device ID and is obtained from the device.

4. The method of claim 1, further comprising:

obtaining, from the device, an updated device ID;

wherein obtaining the validation package comprises combining the updated device ID and the validation timestamp.

5. The method of claim 1, further comprising:

obtaining, from the first memory on the device, an updated device ID for the device;

comparing a validation device ID and the updated device ID, wherein the validation device ID is obtained from the validation package and is based on the request device ID.

6. The method of claim 1, wherein comparing the validation timestamp to the updated timestamp comprises:

subtracting the validation timestamp from the updated timestamp, resulting in a timestamp delta; and determining whether the timestamp delta is within an authentication range.

7. The method of claim 1, further comprising revalidating the validation timestamp, the revalidation comprising:

obtaining, after obtaining the updated timestamp, a second updated timestamp; and comparing the second updated timestamp to the validation timestamp.

8. The method of claim 7, wherein the revalidating is performed periodically.

9. The method of claim 7, wherein the revalidating the validation timestamp further comprises revalidating the signature.

10. A system comprising:

a processor; and a memory in communication with the processor, the memory containing program instructions that, when executed by the processor, are configured to cause the processor to perform a method, the method comprising:

receiving an access-key package, wherein the access-key package comprises a signature;

obtaining a validation package from a first memory, wherein the validation package comprises a validation timestamp;

validating the signature in the access-key package;

obtaining an updated timestamp from a second memory;

comparing the validation timestamp to the updated timestamp;

determining, based on the comparing, whether a timestamp delta between the validation timestamp and the updated timestamp is within an authorization window; and making an authentication decision based on the determining and the validating.

11. The system of claim 10, wherein the method performed by the processor further comprises:

hashing the validation package, resulting in a hashed validation package;

decrypting the signature, resulting in a decrypted signature; and comparing the decrypted signature and the hashed validation package.

12. The system of claim 10, wherein the method performed by the processor further comprises:

obtaining, from the first memory, an updated device identifier ("ID;

wherein obtaining the validation package comprises combining the updated device ID and the validation timestamp.

13. The system of claim 10, wherein the method performed by the processor further comprises:

obtaining, from the first memory, a request device identifier ("ID") for a device and an updated device identifier for the device;

comparing a validation device ID and the updated device ID, wherein the validation ID is obtained from the validation package and is based on the request device ID.

14. The system of claim 10, wherein comparing the validation timestamp to the updated timestamp comprises:

subtracting the validation timestamp from the updated timestamp, resulting in a timestamp delta; and determining whether the timestamp delta is within an authentication range.

15. The system of claim 10, wherein the method performed by the processor further comprises revalidating the validation timestamp, the revalidation comprising:

obtaining a further updated timestamp; and comparing the further updated timestamp to the validation timestamp.

* * * * *